(No Model.)
F. HUGERSHOFF.
DRIVING MECHANISM FOR HAND POWER CENTRIFUGAL MACHINES.
No. 556,888. Patented Mar. 24, 1896.
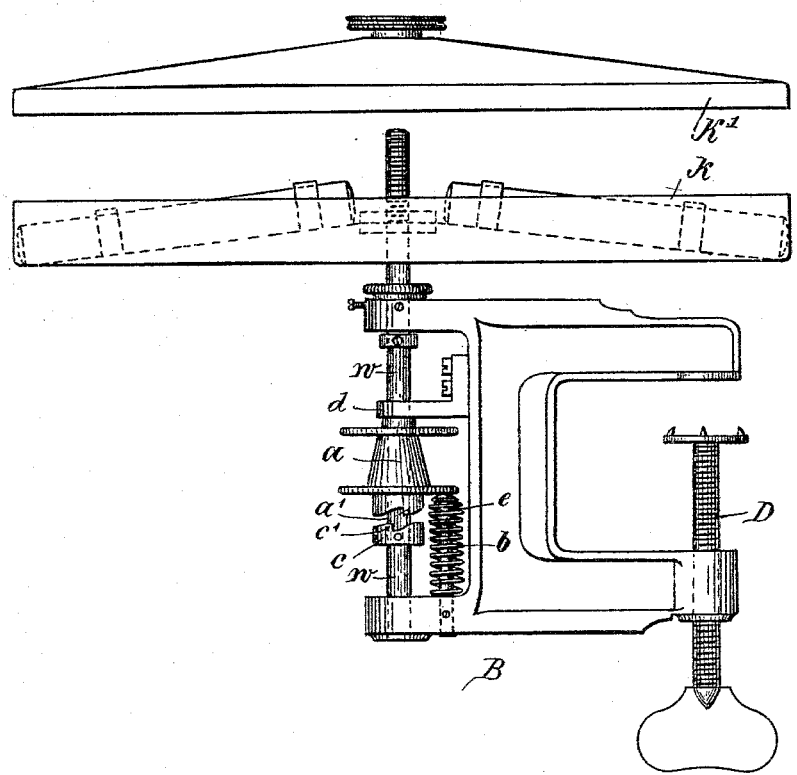
Witnesses:
Thomas M. Smith.
Richard C. Maxwell.
Inventor:
Franz Hugershoff,
By J. Walter Douglass.
Attorney.

UNITED STATES PATENT OFFICE.

FRANZ HUGERSHOFF, OF LEIPSIC, GERMANY.

DRIVING MECHANISM FOR HAND-POWER CENTRIFUGAL MACHINES.

SPECIFICATION forming part of Letters Patent No. 556,888, dated March 24, 1896.

Application filed November 4, 1895. Serial No. 567,786. (No model.)

*To all whom it may concern:*

Be it known that I, FRANZ HUGERSHOFF, a subject of the Emperor of Germany, residing at Leipsic, in the Kingdom of Saxony and Empire of Germany, have invented certain new and useful Improvements in Driving Mechanism for Hand-Power Centrifugal Machines, of which the following is a specification.

My invention has relation to driving mechanism for that class of centrifugal machines which are driven by hand and are adapted especially for physiological research, such as the examination of milk or the sedimentation of urine, sputum and the like, and in such connection it relates particularly to the construction and arrangement of the driving mechanism for said machines.

The principal objects of my invention are, first, to provide a simple, durable and efficient driving mechanism for centrifugal machines; second, to provide in a centrifugal machine driving mechanism consisting of an axis carrying a toothed disk, a conical toothed driving-disk having a range of movement on the axis, and a belt, band or the like adapted to actuate the movable disk and to force the same into engagement with the fixed disk, and, third, to provide in such a mechanism elastic means adapted to uncouple the driving-disk from the fixed disk when said driving-disk is not actuated.

My invention, stated in general terms, consists of a driving mechanism for hand-power centrifugal machines constructed and arranged in substantially the manner hereinafter described and claimed.

The nature and scope of my invention will be more fully understood from the following description taken in connection with the accompanying drawing forming part hereof, representing in side elevation a hand-power centrifugal machine with driving mechanism embodying the main features of my present invention.

Referring to the drawing, $w$ represents the axis of the shaft of the machine rotating in a bracket B, which may be secured by a clamping-screw D to a table or support. This shaft $w$ carries a case $k$, in which the test-tubes are mounted and secured in any suitable manner and afterward incased by a cover $k'$, adapted to be screwed down or otherwise secured to the same. The shaft $w$ also carries a disk or collar $c$, the upper face of which is toothed or notched, as at $c'$. Loosely secured on the shaft $w$ and having a range of vertical movement thereon is a flanged conical pulley $a$, carrying on its under face a disk or collar having a tooth or projecting lug $a'$. This pulley $a$ and its disk or collar are normally held up so that the tooth $a'$ is out of engagement with the teeth $c'$ of the disk or collar $c$ by means of preferably a spiral spring $b$, coiled about a pin of the bracket B, one end resting against the bracket B and the other against a sleeve $e$, which is pressed thereby under the lower flange of the pulley $a$. The movement of the pulley $a$ upward under the influence of the spring $b$ is limited by a sleeve or arm $d$, projecting from the bracket B. The pulley $a$, described as being conical, is so arranged that the base or greater diameter of its conical portion is adjacent to the flange carrying the toothed collar $a'$.

To set the machine in action a cord or band is wound upon the conical body of the pulley $a$, after which it is unwound by pulling the cord or band downward and outward, the downward pull being sufficient to slide the pulley $a$ downward on the shaft $w$, while the outward pull gives a rotary movement to the said pulley $a$. The downward movement of the pulley overcomes the upward push or thrust of the spring $b$ and brings the toothed collar or disk $a'$ into engagement with the toothed collar or disk $c$, so that rotary movement imparted to said disk $c$ and shaft $w$ is transmitted from said pulley $a$ and its disk $a'$. When the cord is unwound the spring $b$ returns the pulley $a$ to its normal position out of engagement with the disk $c$.

It is obvious that instead of a coiled spring $b$ any other elastic means for raising the pulley $a$ may be used, which means may be located either as shown in the drawing or around the shaft $w$ between the disks or collars $c$ and $a'$ without departing from the spirit of my invention.

Having thus described the nature and objects of my invention, what I claim as new, and desire to secure by Letters Patent, is—

1. In a driving mechanism for hand-power centrifugal machines, a shaft, a toothed collar or disk secured thereto, a driving-pulley having a conical surface and flanged ends for the reception of the driving cord or belt, a disk carried by said pulley provided with a downwardly-projecting tooth, said pulley and disk rotating loosely about said shaft and normally held when not actuated out of engagement with the fixed disk of said shaft, the arrangement being such that when the driving-belt is actuated to rotate said pulley, the disk and pulley may be moved downward into axial contact until the fixed and movable disks are brought into engagement, substantially as described.

2. In a driving mechanism for hand-power centrifugal machines, a shaft, a conical flanged driving-pulley and a toothed disk loosely rotating on said shaft, a toothed disk fixed to said shaft, elastic means for supporting said pulley and loose disk out of engagement with said fixed disk, and means for actuating said pulley to move the same in a rotary and downward direction to bring the loose disk in engagement with the fixed disk against the influence of the elastic supporting means, substantially as described.

3. In a driving mechanism for hand-power centrifugal machines, a shaft, a conical flanged driving-pulley, a toothed disk carried thereby and loosely rotating therewith about said shaft, a toothed disk fixed to said shaft, a bracket forming the bearings for said shaft, a coiled spring interposed between said bracket and flanged pulley to support the latter and loose disk out of engagement with the fixed disk, and a cord or belt wound around the conical body of the pulley and adapted when unwound to move the pulley and loose disk downward in an axial direction into engagement with the fixed disk and to rotate the pulley, loose and fixed disks and shaft, substantially as described.

In testimony whereof I have hereunto set my signature in the presence of two subscribing witnesses.

FRANZ HUGERSHOFF.

Witnesses:
   L. HORMUTH,
   RUDOLPH FRICKE.